(12) United States Patent
Asmussen et al.

(10) Patent No.: US 11,093,179 B2
(45) Date of Patent: Aug. 17, 2021

(54) TAPE DRIVE SYSTEM

(71) Applicant: International Business Machines Corporation, Armonk, NY (US)

(72) Inventors: Ole Asmussen, Henstedt-Ulzburg (DE); Robert Beiderbeck, Wassenberg (DE); Erik Rueger, Ockenheim (DE); Markus M. Schaefer, Heiligenmoschel (DE)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 15/468,228

(22) Filed: Mar. 24, 2017

(65) Prior Publication Data

US 2018/0275901 A1 Sep. 27, 2018

(51) Int. Cl.
*G06F 12/00* (2006.01)
*G06F 3/06* (2006.01)

(52) U.S. Cl.
CPC .......... *G06F 3/0682* (2013.01); *G06F 3/0607* (2013.01); *G06F 3/067* (2013.01); *G06F 3/0658* (2013.01); *G06F 3/0661* (2013.01)

(58) Field of Classification Search
CPC .... G06F 3/0625; G06F 3/0659; G06F 3/0682; G06F 3/0607; G06F 3/0658; G06F 3/0661; G06F 3/067
See application file for complete search history.

(56) References Cited

U.S. PATENT DOCUMENTS

| 8,886,606 | B2 | 11/2014 | Wideman | |
|---|---|---|---|---|
| 9,195,402 | B1* | 11/2015 | Hostetter | ................ G06F 3/061 |
| 9,208,818 | B1 | 12/2015 | Freitag et al. | |
| 2012/0237321 | A1* | 9/2012 | Akiyama | ........... G11B 15/6835 |
| | | | | 414/222.02 |
| 2013/0110778 | A1* | 5/2013 | Taylor | ................. G06F 11/1435 |
| | | | | 707/624 |
| 2013/0290388 | A1* | 10/2013 | Lenox | ................... G06F 3/0611 |
| | | | | 707/827 |

(Continued)

OTHER PUBLICATIONS

Maksimovic, et al. "Raspberry Pi as Internet of Things hardware: Performances and Constraints" (Year: 2014).*

(Continued)

*Primary Examiner* — Gurtej Bansal
(74) *Attorney, Agent, or Firm* — Schmeiser, Olsen & Watts, LLP; Nicholas L. Cadmus

(57) ABSTRACT

A tape drive system as a Network Attached Storage (NAS) device and a method for operating the tape drive system. A tape drive is connected to a native connector disposed in a wall of a housing. The native connector enables an external connection to the tape drive. A single board computer is operated in a dimension of a credit card. The single board computer includes at least one integrated communication interface selected from Wi-Fi, Ethernet, USB, and combinations thereof. Data is transferred to and from the tape drive via the at least one integrated communication interface, wherein if the at least one integrated communication interface includes Ethernet and/or USB, then a connector related to the Ethernet and/or USB is provided in a wall of the housing. The tape drive, the single board computer, the native connector and the related connector are provided in the housing.

17 Claims, 4 Drawing Sheets

(56) References Cited

U.S. PATENT DOCUMENTS

| | | |
|---|---|---|
| 2014/0330817 A1 | 11/2014 | Eleftheriou et al. |
| 2015/0143037 A1* | 5/2015 | Smith .................... G06F 3/061 |
| | | 711/103 |
| 2016/0162198 A1 | 6/2016 | Vijayan et al. |
| 2016/0162210 A1 | 6/2016 | Bucher et al. |
| 2017/0123711 A1* | 5/2017 | Kathpal ................ G06F 3/0641 |

OTHER PUBLICATIONS

Borbinha et al., Proceedings of the 10th International Conference on Preservation of Digital Objects, PRES2013, Sep. 3-5, 2013, Lisbon—Portugal, 363 pages.

* cited by examiner

300 method for operating a tape drive as NAS device

302 connecting a tape drive to a native connector

304 operating a single board computer in a dimension of a credit card

306 transferring data to/from the tape drive via a native connector and/or a USB and/or Ethernet connection and/or WLAN

308 providing the tape drive, the single board computer, the native connector and the related connector in one common housing

FIG. 3

TAPE DRIVE SYSTEM

TECHNICAL FIELD

The invention relates generally to a tape drive system with extended communication interfaces, and more specifically, to a tape drive system for use as a Network Attached Storage (NAS) server and to a method for operating a tape drive system as a NAS server.

BACKGROUND

Currently, a growing number of companies are, in light of big data, data lakes, the Internet of Things phenomenon and an exploding number of sensors producing data, struggling with growing amounts of structured, semi-structured and unstructured data. Often, storing the data on a spinning disk (or any other form of disk equivalent) may be too expensive for the exploding data volumes. On the other side, tape drives offered today may not have appropriate multiple access options but only rely on standard tape interfaces like SAS (serial attached SCSI) or Fiber Channel (FC). Either an expensive access device or a complete server is required in order to operate the tape drive, which for most user companies, does not represent a cost-efficient way to use tapes—in particular LTO tapes (linear tape open tape)—for long-term, cost-effective and low-energy consuming storage.

SUMMARY

Embodiments of the present invention provide a tape drive system as a Network Attached Storage (NAS) device and a method for operating the tape drive system. A tape drive is connected to a native connector disposed in a wall of a housing, said native connector enabling an external connection to the tape drive. A single board computer is operated in a dimension of a credit card, wherein the single board computer comprises at least one integrated communication interface selected from the group consisting of Wi-Fi (wireless local area network), Ethernet, USB (universal serial bus), and combinations thereof. Data to and from the tape drive is transferred via the at least one integrated communication interface, wherein if the at least one integrated communication interface comprises Ethernet and/or USB, then providing a connector related to the Ethernet and/or USB in a wall of the housing. The tape drive, the single board computer, the native connector and the related connector are provided in the housing.

BRIEF DESCRIPTION OF THE DRAWINGS

Embodiments of the invention will be described, by way of example only, and with reference to the following drawings.

FIG. 3 shows a block diagram of an embodiment of the inventive method for operating a tape drive system as a NAS server.

DETAILED DESCRIPTION

Figure 1:
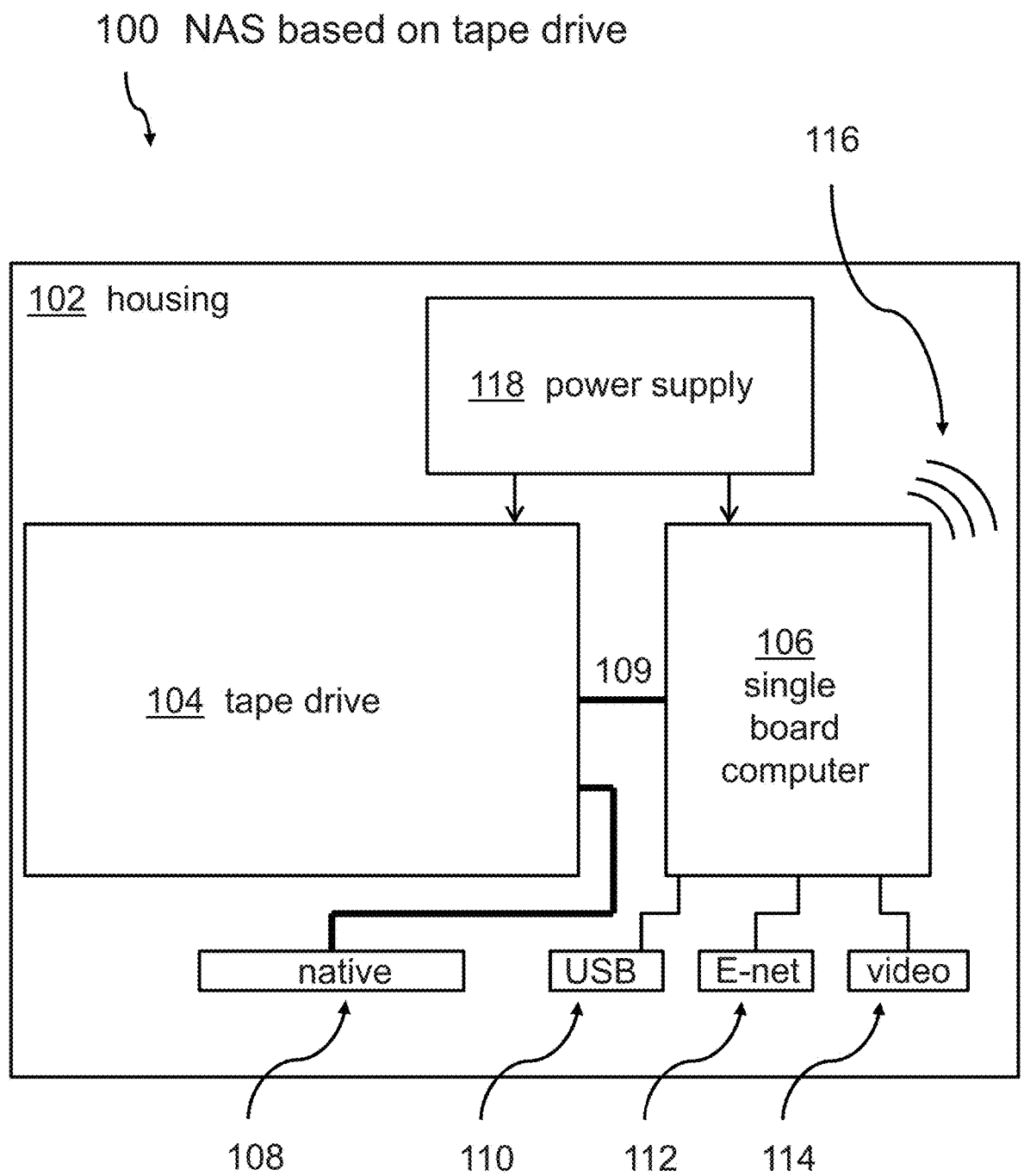
FIG. 1 shows a block diagram of an embodiment of the inventive tape drive system for use as a Network Attached Storage (NAS) server.

In the context of this description, the following conventions, terms and/or expressions may be used.

The term 'tape drive system' may denote a data storage device that reads and writes data on a magnetic tape. Magnetic tape data storage is typically used for offline, archival data storage. Tape media generally has a favorable unit cost and a long archival stability. In the context of the present invention, the tape drive system may primarily use LTO tapes.

The term 'Network Attached Storage (NAS)' may denote a file-level computer data storage server typically connected to a computer network providing data access to a heterogeneous group of clients. NAS is specialized for serving files either by the NAS hardware, software, or configuration. NAS may be manufactured as a computer appliance such as a purpose-built specialized computing storage device. NAS systems are networked appliances which may contain one or more storage drives (e.g., a tape drive).

Network-attached storage removes the responsibility of file serving from other servers on the network and may provide access to files using network file sharing protocols, such as NFS (see below), SMB/CIFS (see below), or AFP (Apple Filing Protocol). NAS devices are popular as a convenient method of sharing files among multiple computers. Potential benefits of dedicated network-attached storage, compared to general-purpose servers also serving files, include faster data access, easier administration, and simple configuration.

The term 'native connector' may denote a typical connector with which tape drives are connected to other systems like servers. Here, a native connector may be a SAS connector or a Fiber Channel connector.

The term 'single board computer' (SBC) may denote a complete computer built on a single circuit board with microprocessor(s), memory, input/output (I/O) and other features required for a functional computer. Unlike a desktop personal computer, single board computers often do not rely on expansion slots for peripheral functions or expansion. A specialty of the SBC, used as part of the present invention, is that the SBC has a horizontal expansion in the size of a credit card; e.g., about 85.60 mm×53.98 mm. Plus or minus one centimeter in each direction is tolerable.

The term 'Ethernet' may denote a family of computer networking technologies commonly used in local area networks (LANs) and metropolitan area networks (MANs). Ethernet is based on the standard IEEE 802.3, and has since been refined to support higher bit rates and longer link distances. Today, 1000 Mbit/sec is a typical transfer rate for Ethernet. However, Ethernet may also be slower; e.g., 100 Mbit/sec. A typical connector specification used is called RJ45.

The term 'USB' (Universal Serial Bus) may denote an industry standard developed in the mid-1990s that defines the cables, connectors and communication protocols used in a bus for connection, communication and power supply between computers and electronic devices. USB is currently developed by the USB Implementers Forum (USB IF). Currently used versions are USB 2.0 and USB 3.0. However, the present invention is not limited to any of these standards as long as the connector is a USB connector (normal size, USB Type-C or others).

The term 'LTO5, LTO6, LTO7, LTO8 and/or LTO9' may denote a magnetic tape data storage technology originally developed in the late 1990s as an open standards alternative to the proprietary magnetic tape formats that were available at the time. The LTO Consortium directs development and manages licensing and certification of media and mechanism manufacturers.

The standard form-factor of LTO technology goes by the name Ultrium®, the original version of which was released in 2000 and can hold 100 GB of data in a cartridge. The seventh generation of LTO Ultrium was released in 2015 and can hold 6.0 TB in a cartridge of the same size. Upon introduction, LTO Ultrium rapidly defined the super tape market segment and has consistently been the most widely used super tape format. The present invention is open to include also future version of the LTO standard.

The term 'SAS' (Serial Attached SCSI) may denote a point-to-point serial protocol that moves data to and from computer storage devices such as hard drives and tape drives. SAS may have replaced the older Parallel SCSI (Small Computer System Interface) bus technology. SAS, like its predecessor, uses the standard SCSI command set. SAS offers backward compatibility with SATA, versions 2 and later, which allows for SATA drives to be connected to SAS backplanes. Typical data transfer rates are 12 Gbit/sec (SAS-3 available since 2013) and 22.5 Gbit/sec (SAS-4 expected in 2017). The present invention may also work with any SAS specification.

The term 'Fiber Channel' (FB) may denote a high-speed network technology (commonly running at 1, 2, 4, 8, 16, 32, and 128 Gbit/sec rates) primarily used to connect computer data storage to servers. Fiber Channel is mainly used, but not limited to, in storage area networks (SAN) in commercial data centers. Fiber Channel networks form a switched fabric by operating as one big switch. Fiber Channel typically runs on optical fiber cables within and between data centers. In the context of the present invention, FC connection may support the Fiber Channel Protocol (FCP) as transport protocol that predominantly transports SCSI commands over Fiber Channel networks.

The term 'Linux-type operating system' may denote the well-known Unix-like computer operating system assembled under the model of free and open-source software development and distribution. The defining component of Linux is the Linux kernel, an operating system kernel first released in 1991. The present invention may work with any derivative of the Linux operating system and also other operating systems for SBCs.

The term 'LTFS' (linear tape file system) may denote a system that typically allows files, stored on magnetic tape to be accessed in a similar fashion to those files stored on disks or removable flash drives, which may require both, a specific format of data on the tape media and software to provide a file system interface to the data. The LTFS technology, based around a self-describing tape format, was adopted by the LTO Consortium in 2010. The usage of LTFS in the present invention allows the LTO tape drive to be used as NAS.

The term 'NFS' (Network File System) may denote the well-known distributed file system protocol originally developed in 1984, allowing a user on a client computer to access files over a computer network much like local storage is accessed. NFS, like many other protocols, builds on the Open Network Computing Remote Procedure Call (ONC RPC) system. The NFS is an open standard defined in Request for Comments (RFC), allowing anyone to implement the protocol and may be used in the present invention advantageously.

The term 'SMB/CIFS' may denote a version of which was also known as Common Internet File System (CIFS) that may operate as an application-layer network protocol mainly used for providing shared access to files, printers, and serial ports and miscellaneous communications between nodes on a network. SMB/CIFS also provides an authenticated inter-process communication mechanism.

The tape drive system used by the present invention as a NAS server may offer multiple advantages and technical effects.

Potentially, required bridge boxes between a tape drive and any network connection may become obsolete, which may reduce required space for the tape-based NAS, as well as related costs. On the other side, high flexibility in terms of communication connections to/from the tape-based NAS is added to the classical data storage form of a tape. However, the tape drive system may also be used in the classical way (using the native connector (SAS or FC)) in a tape library system or integrated in any other computing device like a server or a desktop system. Thus, the tape drive system is much more flexible in terms of physical connections, including Wi-Fi, if compared to traditional tape drive systems using only native connections (e.g., SAS, FC).

Actually, a housing of a traditionally available bridge box may be used to integrate all required components: the tape drive, the power supply, potentially a fan, the single board computer and all connectors.

In order to use the tape drive system, only a USB cable may be required to connect the tape drive system to any of the following devices: a laptop PC, desktop PC, any workstation or any other computing device (e.g., tablet computer, smartphone). However, it may be more convenient to connect any of the preceding devices via an Ethernet cable or Wi-Fi in order to make use of the advantages of a tape-based NAS. In comparison with traditional disk-based NAS, tapes may be changed in the tape drive system. Thus, it is no longer required to stay in the 8-meter limit of a standard SAS connection between the tape drive and a server. The communication between the tape drive system running in NAS mode and any computing device may be encrypted and may not be limited to the SAS communication protocol. It may also be noted that Ethernet connections between a traditionally available bridge box and the tape drive may only be used for maintenance purposes and not for any data transfer to/from a storage tape. Furthermore, currently used library or archiving systems may no longer be forced to communicate to the tape drive via the SAS (or FC) interface. Instead, all of the other available communication interfaces (USB, Ethernet, Wi-Fi) may be used.

In the following, additional embodiments of the inventive concept will be described.

According to one embodiment of the tape drive system, the single board computer may also comprise a video interface and a related connector as part of the housing. The video interface may be adapted for connecting a display to the tape drive system in order to define a general configuration set-up if a network connection is not yet, or no longer (due to a network driver error), available.

According to one additional embodiment of the tape drive system, the tape drive may be compliant to any of the tape cartridge standards LTO5, LTO6, LTO7, LTO8 and/or LTO9 (or future versions). Thus, the tape drive system may be compatible with current and future versions of the linear tape open standard.

According to one embodiment of the tape drive system, the native connector may be compatible with SAS or Fiber Channel and are the typical connectors used to attach tape drives to computer systems or servers. Thus, the tape drive system may, besides working via other communication interfaces, also operate in classical environments, like tape robot systems and large archiving systems.

According to one embodiment, the tape drive system may also comprise an integrated power supply providing required power supply lines for the tape drive and the single board computer. The power supply may also be integrated into the common housing for the tape drive and the single board computer. Not any separate or additional power supplies may be required.

According to one embodiment of the tape drive system, the single board computer may be enabled for executing a Linux-type operating system. Thus, a low-cost and widely used operating system may be used to control all functions of the tape drive system. Typically, these Linux-type operating systems are available for commercially available single board computers.

According to one further embodiment of the tape drive system, the single board computer may be enabled for executing a web server. Thus, the NAS may be operated equivalently to a disk-based NAS. From a remote site no difference may be detectable.

According to one embodiment of the tape drive system, the tape drive may be enabled to operate in a LTFS mode, which may let the tape drive system appear to be a disk-based NAS. From a remote site no difference may be detectable.

According to one embodiment of the tape drive system, the single board computer may be adapted to support network files sharing protocols selected from NFS (network file system protocol), SMB/CIFS (Server Message Block/Common Internet File System) and AFP (Apple File Service) for supporting data access. It may be noted that the Common Internet File System (CIFS) is a variant SMB protocol, which operates with NetBIOS over TCP/IP (NBT). Thus, a user may choose between a typical disk-based NAS and the inventive tape drive system operable as NAS.

In the following, a detailed description of the figures will be given. All instructions in the figures are schematic. Firstly, a block diagram of an embodiment of the inventive tape drive system for use as a NAS server is given. Afterwards, further embodiments, as well as embodiments of the method for operating a tape drive system as a NAS server, will be described.

FIG. 1 shows a block diagram of an embodiment of the inventive tape drive system 100 for use as a NAS server. The tape drive system 100 comprises in a common housing 102, a tape drive connected to a native connector 108 (in particular SAS or FC) disposed in a wall of the housing 102. The native connector 108 enables an external connection to the tape drive.

The tape drive system 100 comprises a single board computer (SBC) 106 roughly in a dimension of a credit card. It may be noted that the expression 'credit card sized' may relate to a horizontal expansion and may not be applicable for the vertical direction. It may be noted that the term 'roughly' denotes a size which may be plus/minus one centimeter larger or smaller than a credit card and alternatively plus/minus about 2 centimeters larger or smaller than a credit card. Additionally, the single board computer 106 may be smaller than a credit card but also a little bit larger in size than a credit card. The single board computer comprises 106 at least one integrated communication interface: Wi-Fi 116 (wireless local area network), Ethernet 112—typically implemented using a RJ45 connector—and USB 110. The at least one communication interface is enabled for a data transfer to and from the tape drive. In case the at least one communication interface is one of Ethernet 112 and USB 110, a related connector is comprised in the wall of the housing 102. A skilled person may easily understand that also a plurality of USB connections 110 may be possible.

It may also be noted that a native tape drive connection 109 is established between the tape drive 104 and the single board computer 106. The single board computer 106 translates the protocol of this connection 109 (e.g., SAS) to and from the other communication interfaces: USB 110, Ethernet 112, video 114, Wi-Fi 116.

Additionally, a fan (not shown in FIG. 1) may be integrated into the housing 102 allowing a compact design without the risk of overheating. The size of the housing 102 may be in the form of a classical half-height full-height version. Furthermore, the housing may also be equipped with a power grid socket. A power supply 118 supplies the tape drive 102 as well as the SBC 106 with power.

Figure 2:
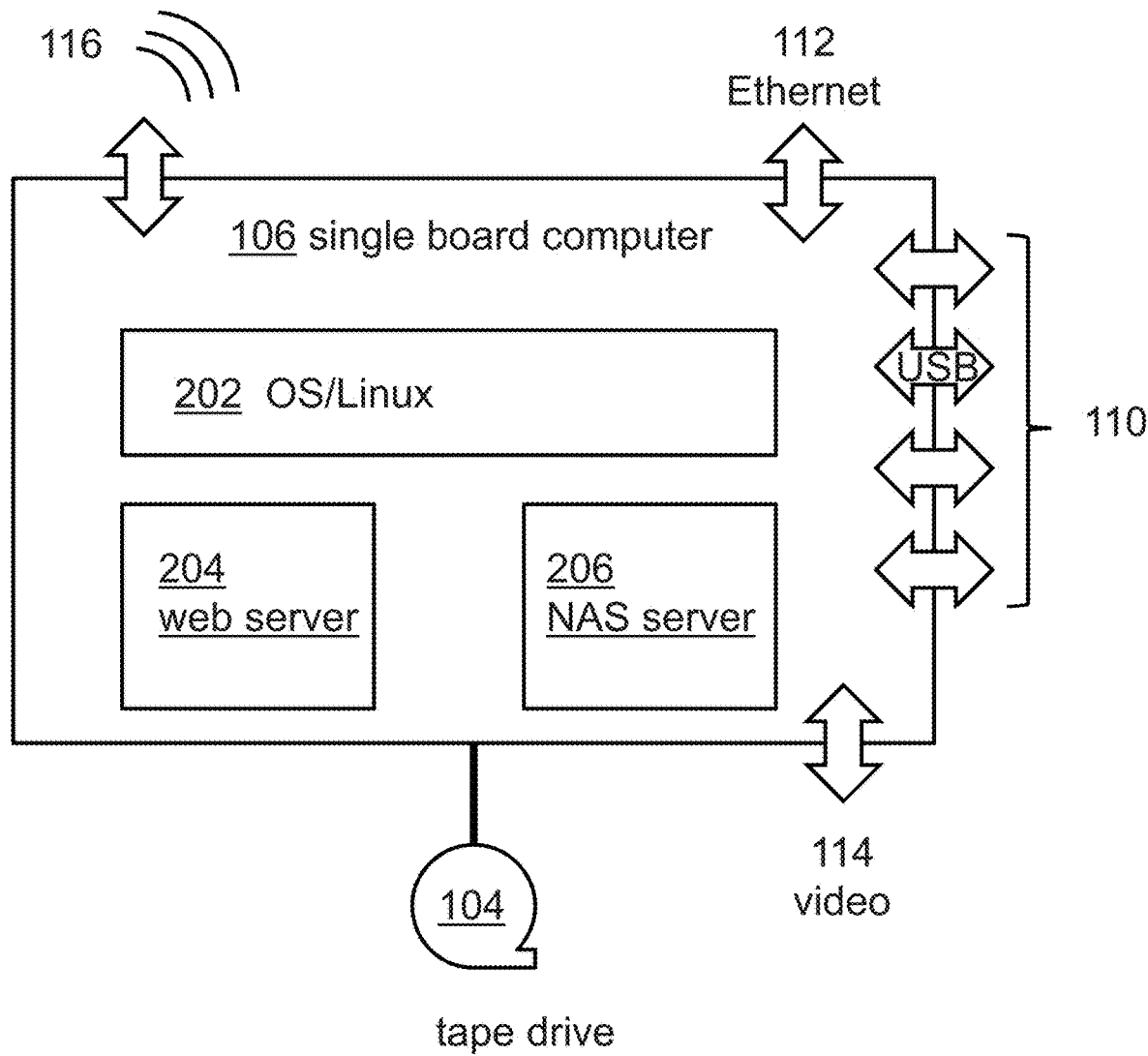
FIG. 2 shows a block diagram of an embodiment of the underlying single board computer.

FIG. 2 shows a block diagram of an embodiment of the underlying single board computer 106. As operating system 202, a Linux-type operating system is used. The operating system 202 and/or related drivers enable a communication to connections or devices outside the SBC 106, which may include a plurality of USB connections 110, the video connection 114, the Wi-Fi connection 116 and the connection to the tape drive 104 via the native interface. Furthermore, the single board computer may be adapted to operate as a web server 204 and/or a NAS server 206.

FIG. 3 shows a block diagram of an embodiment of the inventive method 300 for operating a tape drive system as a NAS server. The method comprises connecting, (step 302), a tape drive to a native connector in a wall of the housing and enabling an external connection to the tape drive via the native connector. The method comprises further operating, (step 304), a single board computer in a dimension of a credit card. The single board computer comprises at least one integrated communication interface selected out of the group comprising WLAN (wireless local area network), Ethernet and USB. The method comprises also transferring, (step 306), data to and from the tape drive via the at least one communication interface. In case the at least one communication interface is one of Ethernet and USB, the method comprises providing a related connector in a wall of the housing, and providing, (step 308), the tape drive, the single board computer, the native connector and the related connector in one common housing. It may be noted that the sequence of steps of the method, as described here does not have to be followed as described. Other sequences or parallel executions are possible.

Figure 4:
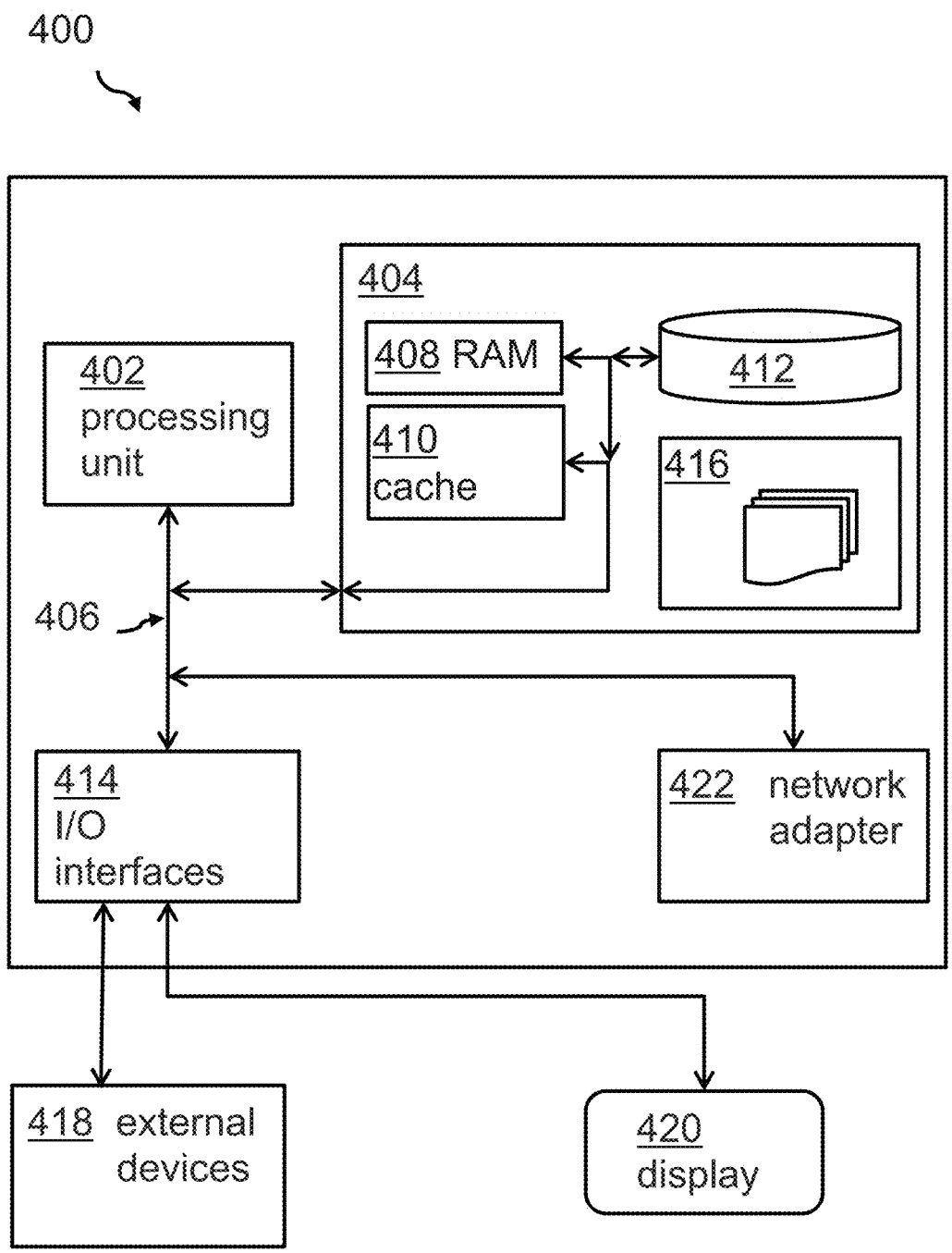
FIG. 4 shows an embodiment of a computing system operable to interact with the tape drive system.

FIG. 4 shows an embodiment of a computing system 400 operable to interact with the tape drive system 100. The computing system 400 may also describe an exemplary embodiment of the single board computer 106 or a computer system operated as a server that may be connected by one of the communication options to the tape drive system 100.

The computing system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 400 is shown in the form of a general-purpose computing device. The components of computer system/server 400 may include, but are not limited to, one or more processors or processing units 402, a system memory 404, and a bus 406 that couples various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computer system/server 400 may further include other removable/non-removable, volatile/non-volatile computer system storage media. By way of example only, storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

The program/utility, having a set (at least one) of program modules 416, may be stored in memory 404 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A tape drive system, said tape drive system comprising:
a housing;
a tape drive connected to a native connector disposed in a wall of the housing, said native connector enabling an external connection to the tape drive;
a single board computer having a dimension of a credit card or having a dimension smaller than the dimension of the credit card, wherein the single board computer comprises one or more microprocessors, memory, and one or more integrated communication interfaces, wherein the one or more integrated communication interfaces are selected from the group consisting of Wi-Fi, Ethernet, USB (universal serial bus), a video interface, and combinations thereof, wherein the one or more integrated communication interfaces are enabled for a data transfer between the tape drive and the one or more integrated communication interfaces, wherein the tape drive and the single board computer are connected to each other within the housing by a native tape drive connection, and wherein the single board computer is configured to translate a protocol of the native tape drive connection for the data transfer between the tape drive and the one or more integrated communication interfaces;
a power supply that supplies power to both the tape drive and the single board computer,
wherein the power supply, the tape drive, the single board computer, the native connector, and the native tape drive connection are within the housing, and
wherein the tape drive system operates as a tape-based Network Attached Storage (NAS) server connected to a computer network providing data access, via the tape drive, to a heterogeneous group of clients.

2. The tape drive system of claim 1, wherein the tape drive is compliant with at least one tape cartridge standard selected from the group consisting of LT05, LTO6, LTO7, LTO8, LTO9, and combinations thereof, and wherein LTO stands for linear tape open.

3. The tape drive system of claim 1, wherein the native connector is compatible with SAS (serial attached small computer system interface) or Fiber Channel.

4. The tape drive system of claim 1, wherein the single board computer is configured to execute a web server.

5. The tape drive system of claim 1, wherein the tape drive is enabled to operate in a LTFS (linear tape file system) mode.

6. The tape drive system of claim 1, wherein the single board computer is configured to support at least one network files sharing protocol selected from the group consisting of NFS (network file system protocol), SMB/CIFS (server message block/common internet file system), AFP (Apple File Service), and combinations thereof for supporting data access.

7. The tape drive system of claim 1, wherein the dimension of the single board computer is smaller than the dimension of the credit card.

8. A method for operating a tape drive system as a Network Attached Storage (NAS) device, said method comprising:
connecting a tape drive to a native connector disposed in a wall of a housing, said native connector enabling an external connection to the tape drive;
operating a single board computer having a dimension of a credit card or having a dimension smaller than the dimension of the credit card, wherein the single board computer comprises one or more microprocessors, memory, and one or more integrated communication interfaces, wherein the one or more integrated communication interfaces are selected from the group consisting of Wi-Fi, Ethernet, USB (universal serial bus), a video interface, and combinations thereof, wherein the tape drive and the single board computer are connected to each other within the housing by a native tape drive connection, and wherein the single board computer is configured to translate a protocol of the native tape drive connection for the data transfer between the tape drive and the one or more integrated communication interfaces;
transferring data to and from the tape drive via the one or more integrated communication interfaces;
operating a power supply that supplies power to both the tape drive and the single board computer,
wherein the power supply, the tape drive, the single board computer, the native connector, and the native tape drive connection are within the housing, and
wherein the tape drive system operates as a tape-based Network Attached Storage (NAS) server connected to a computer network providing data access, via the tape drive, to a heterogeneous group of clients.

9. The method of claim 8, wherein the tape drive is compliant with at least one tape cartridge standard selected from the group consisting of LT05, LTO6, LTO7, LTO8, LTO9, and combinations thereof and wherein LTO stands for linear tape open.

10. The method of claim 8, wherein the native connector is compatible with SAS or Fiber Channel.

11. The method of claim 8, further comprising
executing a Linux-type operating system on the single board computer.

12. The method of claim 8, further comprising:
operating the single board computer as a web server.

13. The method of claim 8, further comprising:
operating the tape drive in an LTFS (linear tape file system) mode.

14. The method of claim 8, comprising:
supporting at least one network files sharing protocol selected from the group consisting of NFS (network file system protocol), SMB/CIFS (server message block/common internet file system), AFP (Apple File Service), and combinations thereof for supporting data access by the single board computer.

15. The method of claim 8, wherein the dimension of the single board computer is smaller than the dimension of the credit card.

16. A computer program product, comprising one or more computer readable hardware storage devices having computer readable program code stored therein, said program code containing instructions executable by one or more processors of a computer system to implement a method for operating a tape drive system as a Network Attached Storage (NAS) device, said method comprising:

connecting a tape drive to a native connector disposed in a wall of a housing, said native connector enabling an external connection to the tape drive;

operating, by the one or more processors, a single board computer having a dimension of a credit card or having a dimension smaller than the dimension of the credit card, wherein the single board computer comprises one or more microprocessors, memory, and one or more integrated communication interfaces, wherein the one or more integrated communication interfaces are selected from the group consisting of Wi-Fi, Ethernet, USB (universal serial bus), a video interface, and combinations thereof, wherein the tape drive and the single board computer are connected to each other within the housing by a native tape drive connection, and wherein the single board computer is configured to translate a protocol of the native tape drive connection for the data transfer between the tape drive and the one or more integrated communication interfaces;

transferring, by the one or more processors, data to and from the tape drive via the one or more integrated communication interfaces;

operating a power supply that supplies power to both the tape drive and the single board computer, wherein the power supply, the tape drive, the single board computer, the native connector, and the native tape drive connection are within the housing, and wherein the tape drive system operates as a tape-based Network Attached Storage (NAS) server connected to a computer network providing data access, via the tape drive, to a heterogeneous group of clients.

17. The computer program product of claim 16, wherein the dimension of the single board computer is smaller than the dimension of the credit card.

* * * * *